Patented Aug. 21, 1945

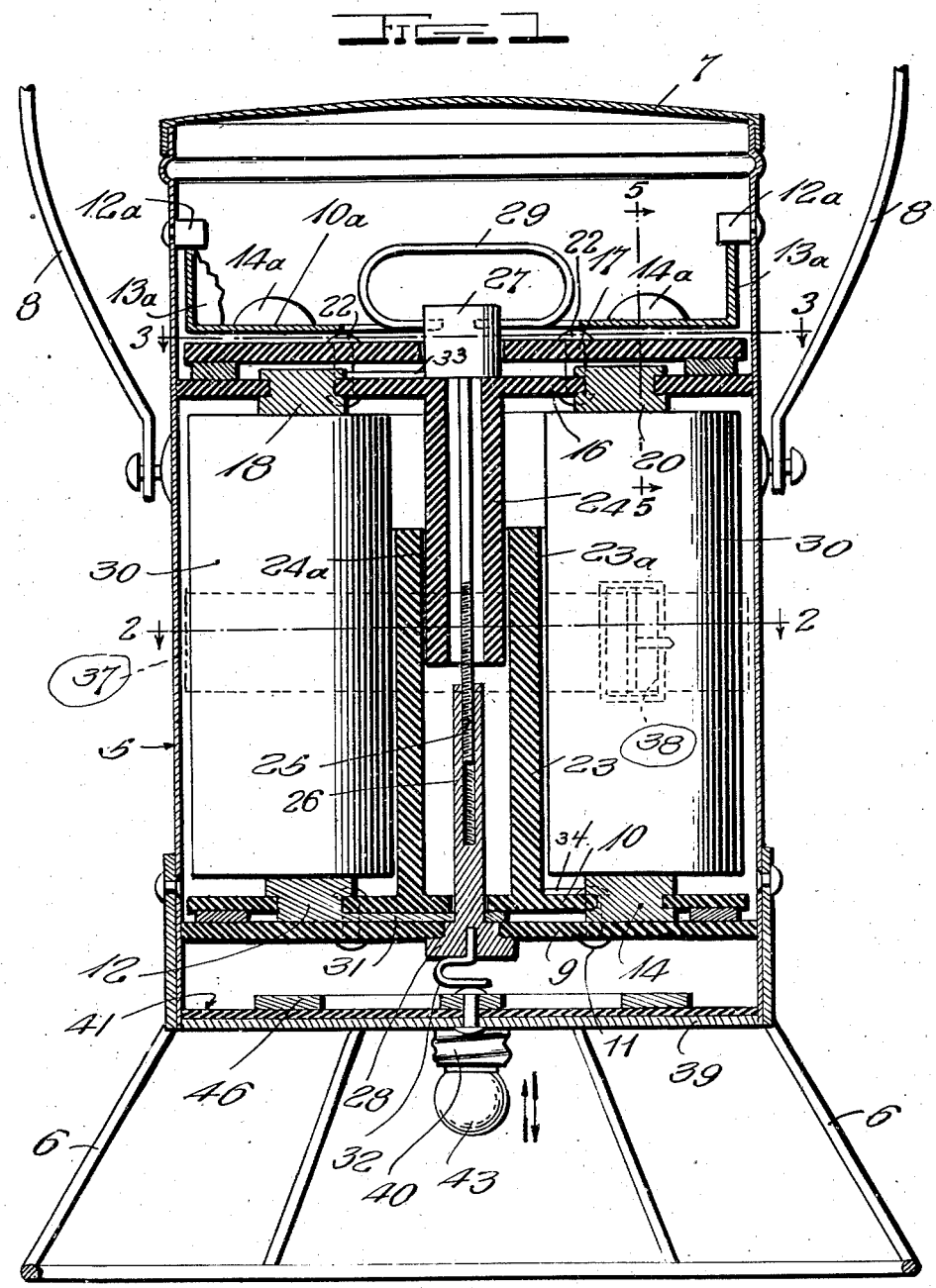

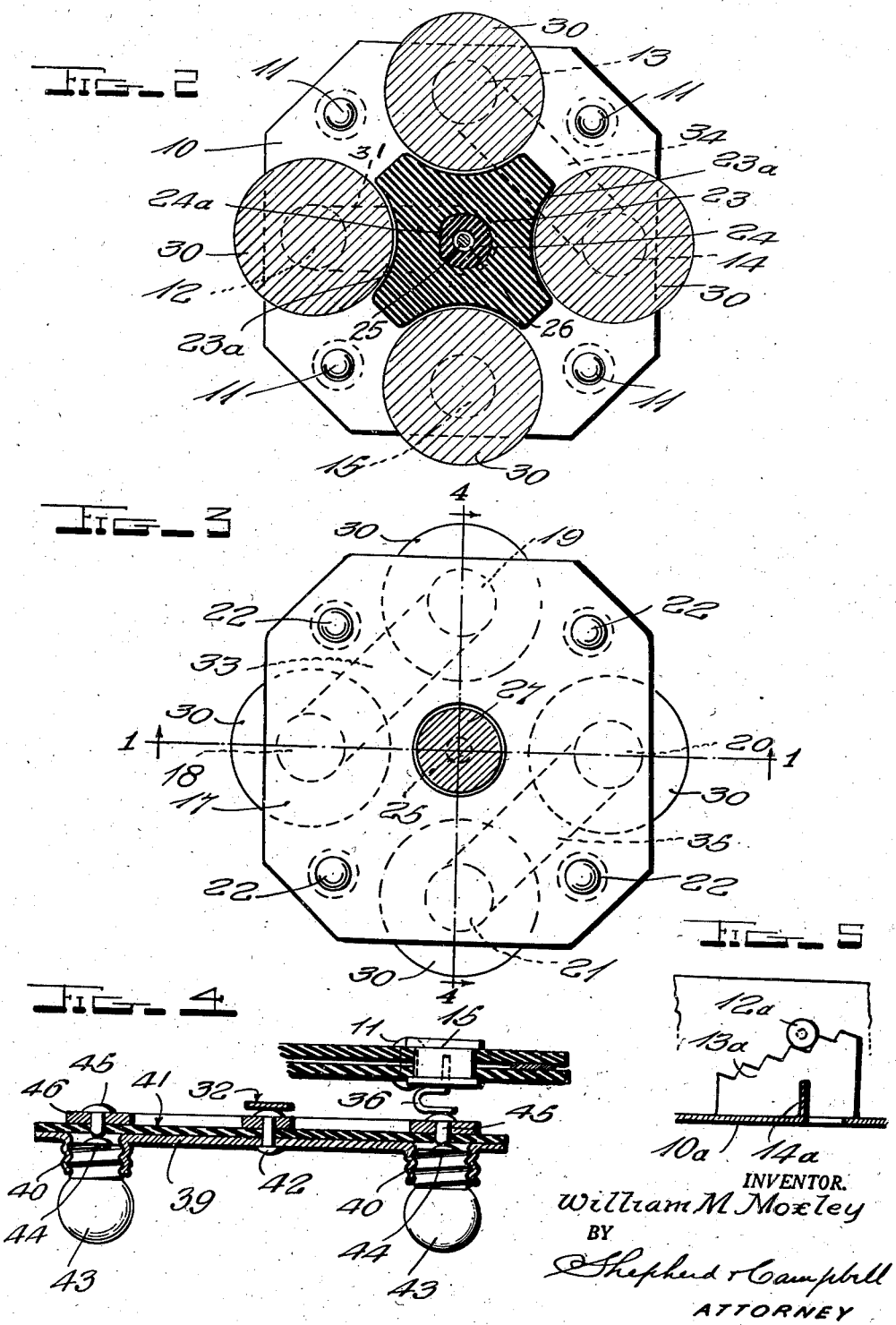

2,383,337

UNITED STATES PATENT OFFICE 2,383,337

EXTENSIBLE BATTERY CELL HOLDER FOR ELECTRIC LANTERNS

William M. Moxley, Kansas City, Mo.

Application February 23, 1944, Serial No. 523,607

6 Claims. (Cl. 240—10.63)

The primary purpose of the present invention is to provide a battery assembly unit adapted to accommodate varying lengths of batteries or dry cells, or groups of the same, while still ensuring efficient electrical connection between the several dry cells and the light bulbs of the lantern.

In the accompanying drawings:

Fig. 1 is a vertical, sectional view on line 1—1 of Fig. 3, of an electric lantern constructed in accordance with the invention, Fig. 2 is a partial horizontal sectional view, on line 2—2 of Fig. 1 with the battery cells in section and showing the bottom member of the cell carrier, in plan.

Fig. 3 is a plan view of the top member of the cell carrier, looking downward from the plane of line 3—3 in Fig. 1.

Fig. 4 is a fragmentary transverse sectional view through the lantern bottom on line 4—4 of Fig. 3.

Fig. 5 is a fragmentary sectional view on line 5—5 of Fig. 1.

Like numerals designate corresponding parts throughout the several views.

All of the electric lanterns with which I am familiar are so constructed as to take a standard size battery of a single length and since there are a number of different sized battery cells on the market, it follows that the dealer must carry a number of different sizes in stock to fit the various lanterns. Further, the user is frequently in doubt as to the proper length of cell needed for his lantern if he does not happen to have the lantern or an old cell with him at the time of purchase of new cells. By the use of the adjustable cell carrier herein shown and described, the lantern is rendered adjustable as to the length of battery cell required for its use.

The lantern proper comprises a body 5, legs 6, a cover 7 and a handle 8. The battery cell carrier comprises a bottom that is made up of a lower web 9 of insulating material and an upper web 10, also of insulating material. These webs are united by rivets 11 and they carry four metallic contact studs 12, 13, 14 and 15. The top member of the carrier comprises a lower insulating web 16 and an upper insulating web 17. The lower web 16 carries the four contact studs 18, 19, 20 and 21 and the webs 16 and 17 are tied together by rivets 22. The web 10 carries an upstanding sleeve 23 into which a depending sleeve 24 of web 16 telescopes. A male screw 25 engages in the female screw 26 to draw their respective heads 27 and 28 toward each other, the head 28 being shouldered to engage beneath the web 9 and the head 27 being of a size to bear upon web 16. A thumb piece 29 provides means for turning the screw 25. The battery cells are indicated at 30 and it will be understood that in accordance with common practice each alternate cell is inverted so that the positive end of one cell is reversed with respect to the positive end of the next cell. Thus, a series connection may be effected throughout the block or group of cells. One of the contact blocks, to wit, 12 of the bottom element of the carrier is connected by a contact strip 31 with the metallic head 28 of screw 26 and this head is, in turn, provided with a spring contact arm 32 constituting one of the terminals of the carrier assembly. Thus, the circuit would be from 32 through strip 31, contact 12, one battery cell to contact 18, thence through a contact strip 33 to contact 19, thence downwardly through another battery cell 30 to contact 13, thence through contact strip 34 to contact 14, thence upwardly through another battery cell to contact 20, thence through contact strip 35 to contact 21, thence downwardly through the last battery cell 30 to contact stud 15. This contact stud 15 is provided with a spring contact 36 constituting the other terminal of the carrier assembly. I preferably embrace all of the battery cells with a strap 37 having a buckle 38 which holds the cells in place while the assembly is being placed in the assembly body and to further aid in positioning the cells. The sides of the sleeve 23 are provided with concave recesses 23ª. To further insure that the various upper contacts will be properly positioned with respect to the lower contacts, the side of the sleeve 24 is flattened, as indicated at 24ª so that the upper and lower contact carrying webs are forced to lie in definite circumferential position around the lantern body. Any suitable means may be employed for holding the assembly in the lantern body and for holding the cover 7 in place. One such means is illustrated in my Patent #2,315,726. The plate 10ª of the accompanying drawings corresponds to the plate 10 of the aforesaid patent. This plate rests upon the top of the carrier assembly and is provided with thumb pieces 14ª by which the plate may be turned. When so turned inclined cams 13ª having notched upper faces ride under fixed studs 12ª carried by the lantern body, these cams acting to force the plate downwardly. The specific structure of this retainer is not part of the present invention, it having been made the subject of my aforesaid patent. It is illustrated as showing one means of holding the assembly in place.

The metallic bottom of the lantern is indicated at 39 and it carries conventional lamp sockets 40. A plate 41 of insulating material is riveted to the lantern bottom by rivet 42 and this rivet establishes electrical connection between the lantern bottom and the lamp sockets, upon the one hand and the contact 32, upon the other hand. When the lamp bulbs 43 are screwed into the sockets their conventional centering contacts 44 engage rivets 45. These rivets secure a metallic contact ring 46 upon the upper face of the insulating plate 41. Thus, the lamp bulbs themselves serve as switches. In other words, a bulb is lighted by being screwed into its socket and is extinguished by being unscrewed from its socket. Either bulb may be lighted without the other, the circuit being from contact 32, rivet 42, lantern bottom 39 to a lamp socket, thence through the bulb and its center contact to a rivet 45, contact ring 46 to spring contact 36.

The invention is not limited to the precise construction set forth but it includes within its purview whatever changes fairly come within either the terms or the spirit of the appended claims. The battery cells may be varied in number, ways other than those shown may be employed for moving the upper and lower contact carrying members toward and from each other, all within the scope of this patent.

Having described my invention, what I claim is:

1. The combination with an electric lantern body comprising a casing and a cover for the same, of a carrier for battery cells dimensioned to be mounted therein, said carrier comprising upper and lower heads, means constituting a part of and bodily movable with the carrier for moving said heads toward and from each other and a plurality of contact members carried by each of said heads positioned to be engaged by battery cells clamped between said heads, means movable bodily with the carrier for holding the upper and lower heads from turning with respect to each other as they are moved toward and from each other, a plurality of light bulbs carried upon the underside of the lantern body, contact members with which said light bulbs are engaged, additional contact members carried by and bodily movable with the carrier, positioned to engage the said contact members of the bulbs and means carried by the lantern body for bodily thrusting the carrier as a whole toward the contact members of the bulbs.

2. The combination with an electric lantern body comprising a casing and a cover for the same, of a carrier for battery cells dimensioned to be mounted therein, said carrier comprising upper and lower heads, means constituting a part of and bodily movable with the carrier for moving said heads toward and from each other and a plurality of contact members carried by each of said heads positioned to be engaged by battery cells clamped between said heads, means movable bodily with the carrier for holding the upper and lower heads from turning with respect to each other as they are moved toward and from each other, a lamp socket upon the lantern body, a bulb therein, a contact member adapted to be engaged by the center contact of the bulb, a second contact member having electrical connection with the lantern body and two spring contacts depending from the under-side of the battery cell carrier and constituting the terminals of the electrical contacts carried by said carrier, said spring contacts making contact, when the carrier is in place, with the aforesaid contacts of the lantern body and bulb and means carried by the lantern body for bodily thrusting the carrier as a whole lengthwise of the lantern body to bring the depending contacts of the carrier into firm engagement with the contacts of the lantern body and bulb.

3. A battery cell carrier for electric lanterns comprising spaced upper and lower heads of insulating material, a group of metallic contacts carried by each of said heads, telescoping sleeves carried by said heads, a male screw engaged with one of said heads, a female screw engaged with the other of said heads, said screws engaging with each other to draw the heads forcibly together and to clamp conventional battery cells between the contact members of said heads.

4. A structure as recited in claim 3, in combination with an external binding means encircling all of said cells for holding them against lateral movement.

5. A battery carrier for electric lanterns comprising an upper head and a lower head, each head, in turn, comprising a pair of horizontally disposed webs, one above the other, a plurality of contact studs carried by the lower web of the upper head and the upper web of the lower head, sleeves having telescopic engagement with each other, projecting from said heads, the outermost sleeve being channeled to provide recesses for the reception of conventional battery cells, said sleeves being so shaped as to prevent turning movement of the upper head with respect to the lower head and a male and female screw connector extending through said sleeves and bearing upon said heads in a manner to draw them together.

6. A battery carrier for electric lanterns comprising an upper head and a lower head, each head, in turn, comprising a pair of horizontally disposed webs, one above the other, a plurality of contact studs carried by the lower web of the upper head and the upper web of the lower head, sleeves having telescopic engagement with each other, projecting from said heads, the outermost sleeve being channeled to provide recesses for the reception of conventional battery cells, said sleeves being so shaped as to prevent turning movement of the upper head with respect to the lower head and a male and female screw connector extending through said sleeves and bearing upon said heads in a manner to draw them together, means for electrically connecting one of the contact studs of the lower head with said screw and a depending spring contact carried by said screw.

WILLIAM M. MOXLEY.